US009300152B2

(12) United States Patent
Juhasz

(10) Patent No.: US 9,300,152 B2
(45) Date of Patent: Mar. 29, 2016

(54) ELECTRIC VEHICLE CHARGING STATION, SYSTEM, AND METHODS

(71) Applicant: EV Connect, Inc., Culver City, CA (US)

(72) Inventor: Bradley Juhasz, Glendale, CA (US)

(73) Assignee: EV Connect, Inc., El Segundo, CA (US)

( * ) Notice: Subject to any disclaimer, the term of this patent is extended or adjusted under 35 U.S.C. 154(b) by 629 days.

(21) Appl. No.: 13/693,839

(22) Filed: Dec. 4, 2012

(65) Prior Publication Data

US 2014/0152254 A1    Jun. 5, 2014

(51) Int. Cl.
*H02J 7/00*    (2006.01)
*B60L 11/18*    (2006.01)

(52) U.S. Cl.
CPC ........... *H02J 7/0052* (2013.01); *B60L 11/1844* (2013.01); *B60L 2240/70* (2013.01); *Y02E 60/721* (2013.01); *Y02T 10/7005* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 10/126* (2013.01); *Y04S 30/12* (2013.01)

(58) Field of Classification Search
CPC ....... Y02T 90/14; Y02T 90/16; Y02T 90/128; Y02T 90/163; B60L 11/1844
USPC .......................................... 320/104, 107, 109
See application file for complete search history.

(56) References Cited

U.S. PATENT DOCUMENTS

| 2010/0141205 | A1 | 6/2010 | Tyler et al. |
| 2012/0106672 | A1* | 5/2012 | Shelton et al. ................ 375/295 |
| 2012/0109798 | A1 | 5/2012 | Shelton et al. |
| 2012/0143423 | A1 | 6/2012 | Theisen et al. |
| 2012/0197693 | A1 | 8/2012 | Karner et al. |

FOREIGN PATENT DOCUMENTS

EP    2 479 732 A1    7/2012

OTHER PUBLICATIONS

World Intellectual Property Organization, International Search Report and Written Opinion for International Application No. PCT/US2013/068203, mail date Jul. 25, 2014, 11 total pages.

* cited by examiner

*Primary Examiner* — Edward Tso
*Assistant Examiner* — Aaron Piggush
(74) *Attorney, Agent, or Firm* — SoCal IP Law Group LLP; Jonathan Pearce; Steven C. Sereboff

(57) ABSTRACT

There is disclosed an electric vehicle charging station, an electric vehicle charging system, and methods of provisioning and operating an electric vehicle charging station. The electric vehicle charging station may include a power control to control the flow of power from a power grid, a controller coupled to the power controller, and a wireless communications interface operable to communicate using a short range wireless communications protocol. The controller may be configured to communicate with a remote server opportunistically via the wireless communications interface and an available personal computing/communications device external to the electric vehicle charging station.

12 Claims, 10 Drawing Sheets ively garaged. However, without the existence of an infrastructure of public charging station, the applications for PEVs will be limit to commuting and other short-distance travel.

ELECTRIC VEHICLE CHARGING STATION, SYSTEM, AND METHODS

RELATED APPLICATION INFORMATION

This patent is related to the following co-pending applications:

U.S. patent application Ser. No. 13/670,347 filed Nov. 6, 2012 and entitled QUEUE PRIORITIZATION FOR ELECTRIC VEHICLE CHARGING STATIONS.

U.S. patent application Ser. No. 13/670,352 filed Nov. 6, 2012 and entitled MANAGEMENT OF ELECTRIC VEHICLE CHARGING STATION QUEUES.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to charging stations for plug-in electric and hybrid electric vehicles.

2. Description of the Related Art

The owners of plug-in electric and hybrid electric vehicles, which will be referred to herein as PEVs, typically have a dedicated charging station at the home or other location where the vehicle is normally garaged. However, without the existence of an infrastructure of public charging station, the applications for PEVs will be limit to commuting and other short-distance travel. In this patent, a charging station is considered "public" if it is accessible and usable by plurality of drivers, as opposed to a private charging station located at a PEV owner's home. A "public" charging station is not necessarily accessible to any and all PEVs. Public charging stations may be disposed, for example at commercial buildings, shopping malls, multi-unit dwellings, governmental facilities and other locations.

In the U.S., charging stations usually comply with the Society of Automotive Engineers (SAE) standard, SAE J1772™. This standard refers to charging stations as "electric vehicle support equipment", leading to the widely-used acronym EVSE. However, since the only support actually provided by an EVSE is charging, this patent will use the term electrical vehicle charging station or EVCS.

A substantial barrier to wide spread deployment of electric vehicle charging stations in public locations is high initial deployment cost. Additionally, if a site owner wants to control access and collect payment for usage of an EVCS, the site owner will incur addition recurring costs for EVCS management and maintenance. At current cost levels, it may be difficult to justify installation of an EVCS based on economic return alone. Property owners or managers may install on or more EVCS based on secondary considerations such as the convenience of their customers, residents, or employees.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
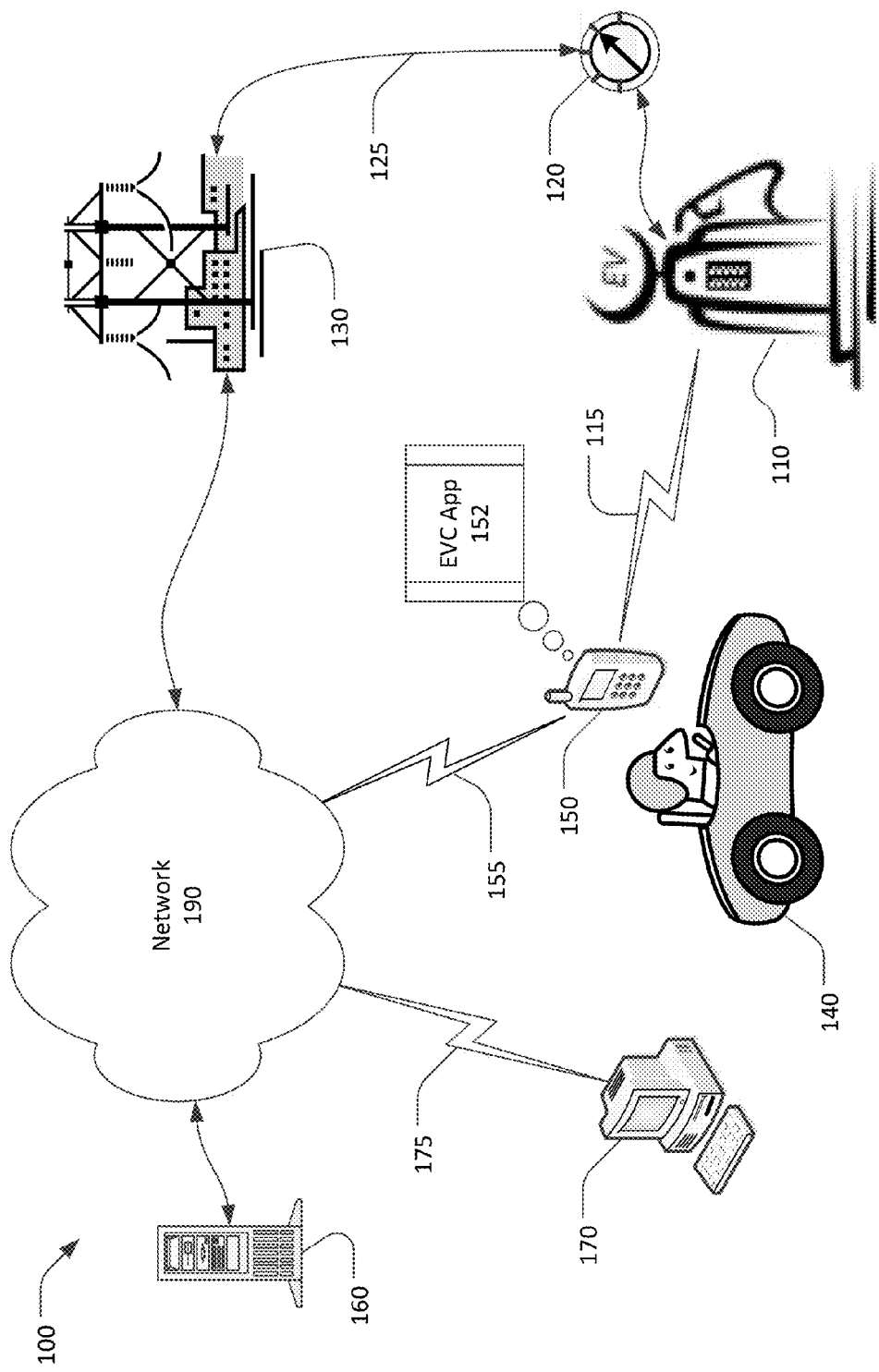
FIG. 1 is a block diagram of an environment for charging an electric vehicle.

Referring now to FIG. 1, an environment 100 for charging an electric vehicle 140 may include an EVCS 110 connected to a utility grid 130 via a meter 120. The EVCS 110 may communicate with a driver's personal communications/computing device (PCD) 150 over a short range wireless communications path 115 using a short range wireless communications protocol. The PCD 150 may, in turn, connect to a wide area network 190 over a second wireless communication path 155. The second wireless communications path 155 may use a second wireless communications protocol different from the short range wireless communications protocol.

The short range wireless communications protocol used for the short range wireless communications path 115 may be, for example, Bluetooth™, ZigBee™, IrDA™, another protocol in accordance with IEEE Standard 802.15, or a future protocol for wireless personal area networks.

The second wireless communications path 155 may use, for example, a wireless local area network protocol such as WiFi™ or a cell phone data communications protocol to connect the PCD 150 to the wide area network 190. The wide area network 190 may include, for example, the Internet and one or more cellular telephone networks.

The PCD 150 may be, for example, a smart phone, a tablet computer, a laptop computer or some other device capable of communicating both with the EVCS 110 using the short range wireless communications protocol and with the wide area network 190 using the second wireless communications protocol. The PCD 150 may run or access an electric vehicle charging application, or "EVC App", 152 that enables the PCD to serve as a user interface for the EVCS 110. The EVC App 152 may be web-based or compiled for use on the PCD. The PCD 150 running the EVC App 152 may also function as a bridge or intermediary to provide bidirectional communications between the EVCS 110 and the wide area network 190.

A network operations server (NOS) 160 may manage a network of vehicle charging stations including the EVCS 110. The NOS 160 may monitor the operation of the EVCS 110. The NOS 160 may manage billing and/or cost allocation for the use of the EVCS. The NOS 160 may manage an authorization system to limit access to the EVCS to only authorized vehicles or drivers. The NOS 160 may also manage a reservation or queue system to allow authorized drivers to reserve future use of the EVCS 110. The NOS 160 may communicate with the EVCS 110 via the wide area network 190, the second wireless communications path 155, the PCD 150, and the short range wireless communications path 115. Communications between the NOS 160 and the EVCS 110 may be opportunistic, which is to say communications between the NOS 160 and the EVCS 110 may only occur when an opportunity arises due to the presence of the PCD 150 running the EVC App 152 proximate to the location of the EVCS 110. Further, communications between the NOS 160 and the EVCS 110 may be discontinuous. For example, the EVCS 110 may transmit data to the PCD 150 for retransmission to the NOS 160. If the PCD is unable to establish a connection to the wide area network from the location of the EVCS 110, the PCD 150 may store the data and transmit the data to the NOS 160 from a different location. Some or all communications between the NOS 160 and the EVCS 110 may be encrypted using an encryption technique and/or encryption keys not available to the PCD 150.

A driver may communicate with the NOS 160 using their PCD 150 or using another computing device such as a personal computer 170 coupled to the network wide area by a wired or wireless communications path 175. The driver may communicate with the NOS 160, for example, to establish an account, to provide billing information, to make a reservation, or for some other purpose.

The meter 120 may be a conventional electric utility meter or a so-called "smart meter" that communicates with the utility grid 130 and the EVCS 110. The EVCS 110 may communicate with a smart meter 120, when present, using the same wireless protocol used to communicate with the PCD 150 or a different wireless communications protocol. The EVCS may communicate with the smart meter 120 using a power line communications (PLC) protocol such as, for example, the IEEE 1901 protocol.

Figure 2:
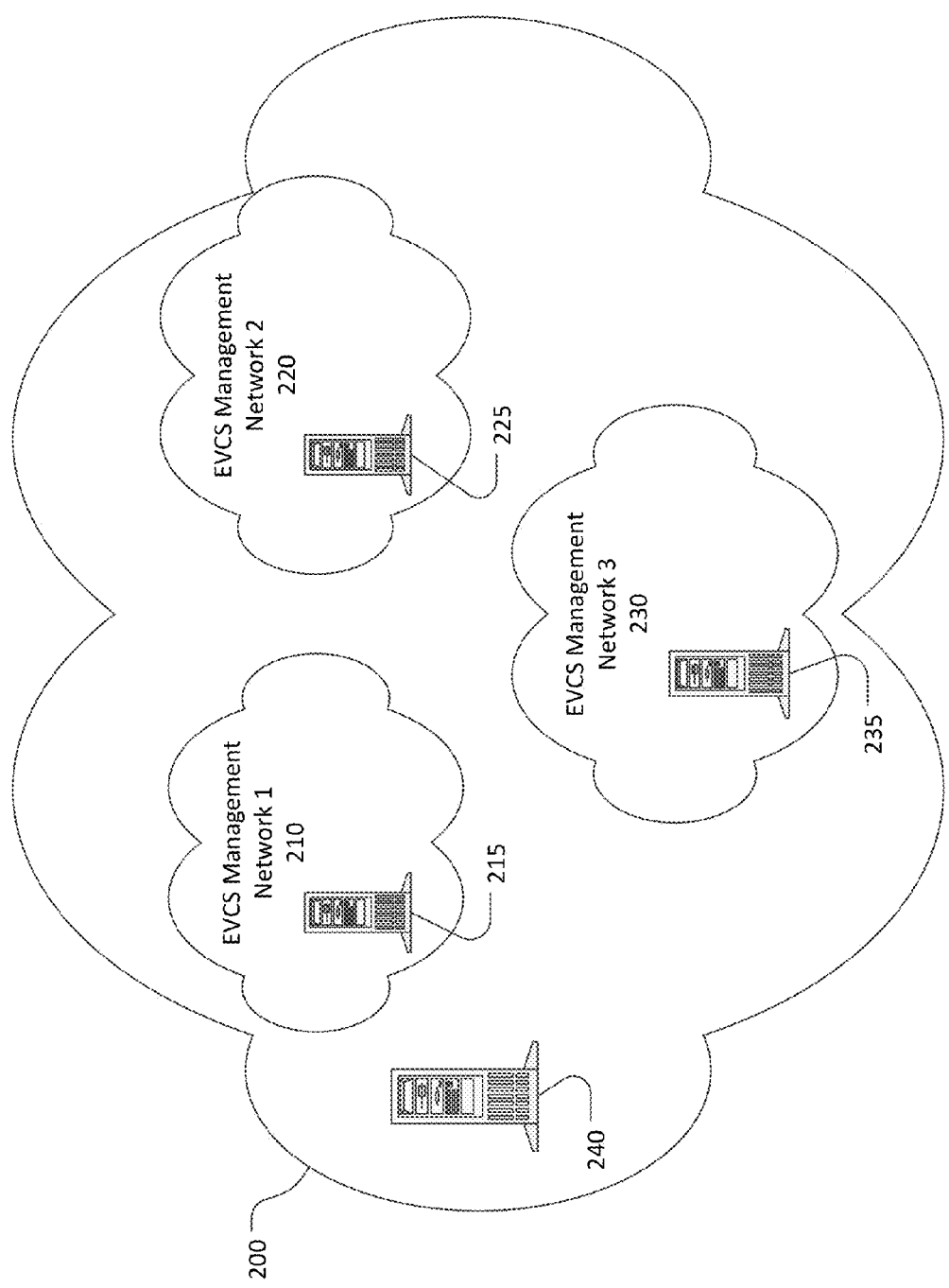
FIG. 2 is a block diagram of an electric vehicle charging station (EVCS) cloud.

Referring now to FIG. 2, a cloud 200 may support a plurality of EVCS management networks, each of with may operate, for example, as a virtual private network within the cloud 200. Three EVCS management networks 210, 220, 230 are shown in this example. A cloud may contain more or fewer than three EVCS management networks. Each of the EVCS management networks may be owned or operated by different business entities such as, for example, electric utility companies and manufacturers of EVCS equipment. The cloud 200 may include a physical or virtual cloud management server (CMS) 240 to manage interactions between the EVCS management networks 210, 220, 230.

Each EVCS management network 210, 220 and 230 may include one or more EVCS operating at respective locations. Each EVCS management network 210, 220, 230 may include a respective NOS 215, 225, 235 to manage access, billing, and queuing for the one or more EVCS within the respective EVCS management network.

The CMS 240 may communicate with each of the EVCS management networks 210, 220 and 230. The CMS 240 may manage transactions between the EVCS management networks 210, 220, and 230. For example, a customer or member of EVCS management network 1 210 may be at a location remote from any EVCS in network 1, and may need to access an EVCS within another EVCS management network. The customer may communicate with NOS 215 with in EVCS management network 1 220 to request access to an "out of network" EVCS. The NOS 215 may then communicate with NOS 225 and/or NOS 235 via CMS 240 to gain customer access to an EVCS within EVCS management network 2 220 or EVCS management network 3 230. Billing and payments for access to the out-of-network EVCS may be processed via the CMS 240.

Figure 3:
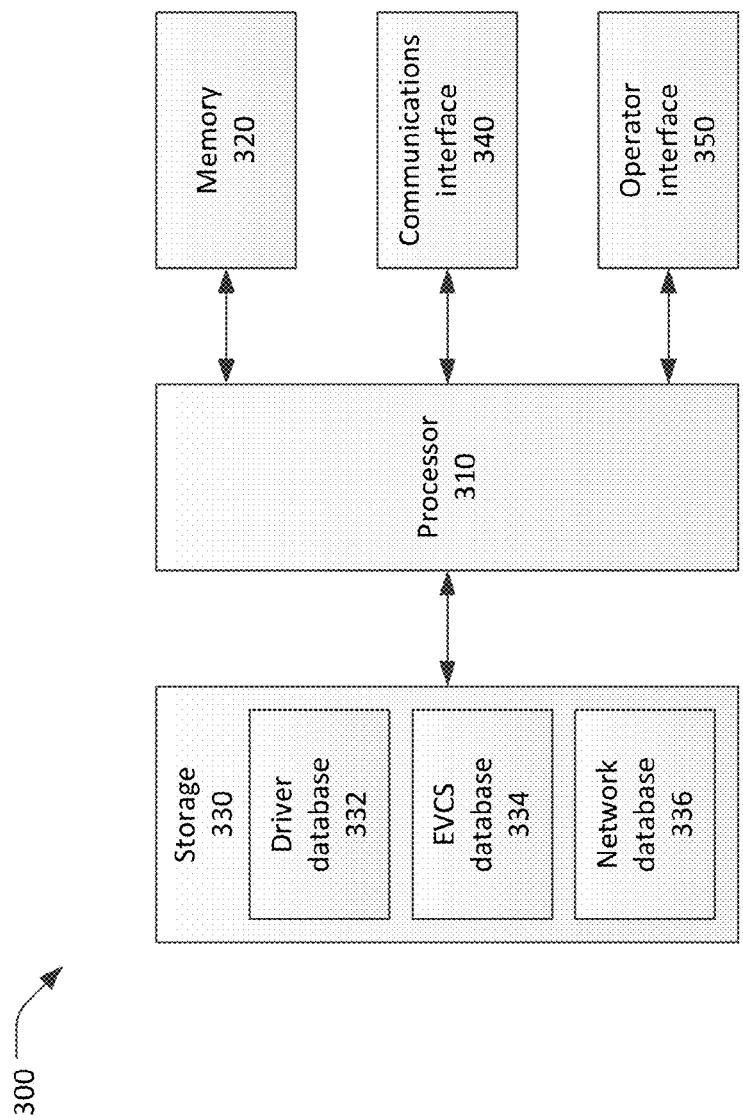
FIG. 3 is a block diagram of a computing device.

Turning now to FIG. 3, a block diagram of a computing device 300 is shown. The computing device 300 may be, for example, the NOS 160 of FIG. 1 or the NOS 215, 225, 235, or 240 of FIG. 2. The computing device 300 may include a processor 310, memory 320, storage 330, a communications interface 340, and an operator interface 350. The storage 330 may store a driver database 332, an EVCS database 334 and/or a network database 336.

The processor 310 may include hardware, which may be augmented by firmware, for providing functionality and features described herein. The processor 310 may include one or more processor circuits such as microprocessors, digital signal processors, and graphic processors. The processor 310 may include other circuits such as logic arrays, analog circuits, and/or digital circuits.

The memory 320 may include static or dynamic random access memory, read-only memory, and/or nonvolatile memory such as flash memory. Information stored in the memory may includes a BIOS (basic input/output system) to initialize the processor 310, interim and final test data, and other data relating to ongoing operation of the processor 310.

The storage 330 may include one or more storage devices. As used herein, a "storage device" is a device that allows for reading and/or writing to a storage medium. These storage media include, for example, magnetic media such as hard disks, optical media such as compact disks (CD-ROM and CD-RW) and digital versatile disks (DVD and DVD±RW); flash memory devices; and other storage media. As used herein, the term "storage medium" means a physical object for storing information. The term "storage medium" does not encompass transitory media such as signals and waveforms.

Information stored in the storage 330 may include a driver database 332. The driver database 332 may contain information pertaining to drivers (or operators) of PEVs that may access the computing device 300. The driver database 332 may include information, for each driver, such as a user name or other unique identification, an associated password, address information, billing information, a driver's real name, a driver's email address, a driver's mobile telephone number and a preferred method of contact. Additional or less information pertaining to a driver may be maintained by the driver database 332. For example, a driver's employment, VIP or group membership status may also be stored in the driver database 332.

Information stored in the storage 330 may include an EVCS database 334. The EVCS database 334 may contain information pertaining to each of the EVCS that are serviced by the computing device 300. For example, in FIG. 2, each NOS 215, 225, 235 managed one or more EVCS within a respective EVCS management network 210, 220, 230. The EVCS database 334 may store information pertaining to the network address (if any) of each EVCS under its service, the capabilities of each EVCS, the current and projected use of each EVCS, any queue of users wishing to access each EVCS (in some cases a group of EVCS may be managed under a single queue, for example, at a location including multiple EVCS), the driver currently using each EVCS and any other information pertaining to each EVCS.

Information stored in the storage 330 may include a network database 336 in addition to or instead of the driver database 332 and/or the EVCS database 334. The network database 336 may include data pertaining to communicating and managing transactions with one or more EVCS management networks. The network database 336 may maintain authentication or other information necessary to enable this access. For example, the CMS 240 in FIG. 2 may include a network database containing information necessary to manage transactions between the EVCS management networks 210, 220, 230. The CMS 240 may not contain a driver database and/or an EVCS database since the CMS 240 may rely upon the NOS 215, 225, and 235 within the respective EVCS networks to store driver and EVCS information.

Information stored in the storage 330 may also include program instructions (not shown) for execution by the processor 310. The program instructions may be in the form of an application program, an applet (e.g., a Java applet), a browser plug-in, a COM object, a dynamic linked library (DLL), a script, or one or more subroutines. The program instructions may include an operating system such as, for example, variations of the Linux™ Microsoft Windows™, Symbian™, Android™, and Apple™ operating systems.

The communication interface 340 may include specialized circuits required to interface the computing device 300 with, for example, a network such as wide area network 190 in FIG. 1, a PCD or a PEV. The communication interface 340 may include interfaces to one or more wired or wireless networks. The communications interface 340 may include, for example, one or more of an Ethernet™ interface for connection to a wired network, a Blue Tooth™ transceiver, a Zigbee™ transceiver, a WiFi™ transceiver, and/or a transceiver for some other wireless communications protocol. The communication interface 340 may be used to communicate information to and/or to receive information from a PCD or a PEV that is or will be using an EVCS.

The operator interface 350 is used for an operator of the computing device 300 to interact with and to operate the computing device 300. The operator interface 350 may include a color or black-and-white flat panel display, such as a liquid crystal display, and one or more data enter devices such as a touch panel, a keyboard, and/or a mouse or other pointing device.

Figure 4:
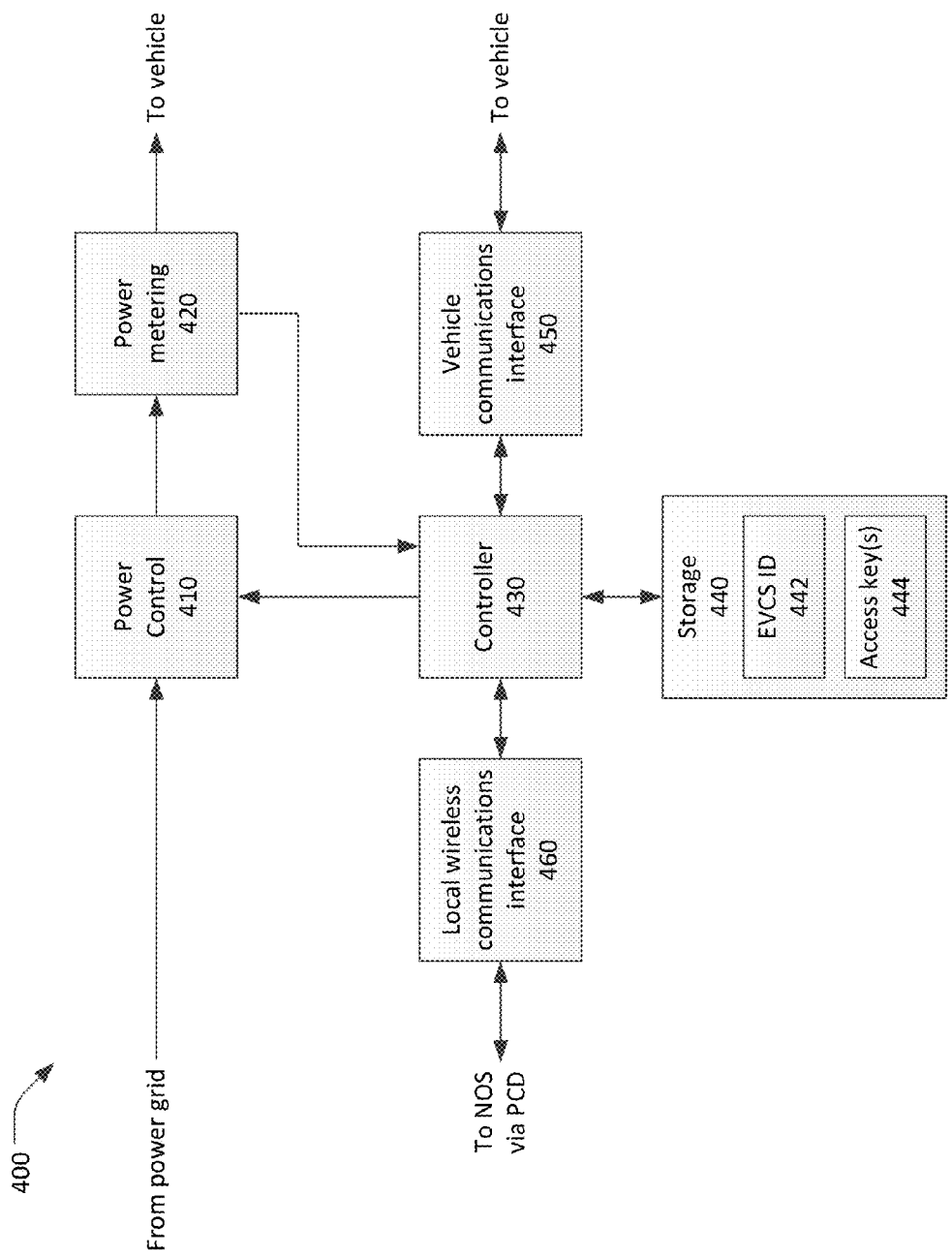
FIG. 4 is a block diagram of an EVCS.

Referring now to FIG. 4, a block diagram of an EVCS 400 is shown. The EVCS 400 may include power control 410, power metering 420, a controller 430, storage 440, a vehicle communication interface 450, and a local wireless communication interface 460.

The storage 440 may provide nonvolatile storage of program instructions and data for use by the controller 430. Data stored in the storage 440 may include an EVCS ID 442 and one or more access key(s) 444. The EVCS ID 442 may be a unique identifier that is used to uniquely identify each EVCS in an EVCS network. The EVCS ID 442 may be, for example, a serial number, a MAC address, some other similar unique identifier, or a combination of two or more identifiers. The EVCS ID 442 may be derived by encrypting a serial number, a MAC address, some other unique identifier, or a combination of two or more identifiers. The EVCS ID 442 may be a random number or other identifier assigned by a remote device such as an NOS that manages an EVCS network containing the EVCS 400. The controller 430 may use the EVCS ID to uniquely identify the EVCS 400 to the network and/or to PEVs using the local wireless communication interface 460 and the vehicle communication interface 450, respectively.

The access keys 444 may include one or more keys that allow a driver to charge a PEV at the EVCS 400. In order to charge a PEV, the driver must provide the EVCS 400 with an access key that matches one of the stored access keys 444. The access keys 444 may include, for example, an access key that allows unlimited use of the EVCS for charging and one or more restricted access keys that allow restricted use of the EVCS. A restricted use access key may be limited to, for example, a specific time window, a particular time of day, or one-time only use. A driver may present an access key to the EVCS, for example, by entering the access key using a keypad or other data entry device, or by communicating the access key wirelessly from a personal communication device.

The access key(s) 444 may also include one or more keys used by an administrator or maintenance personnel to, either remotely or directly at the EVCS 400, access maintenance and administrative features for the EVCS 400. For example, an administrator may be required to input an access key 444 in order to access administrator functions for the EVCS 400.

The storage 440 may store software (not shown) suitable to perform the various functions of the EVCS 400 described herein. The storage 440 may also store data pertaining to usage of various PEVs and associated users such that billing may be properly reported to, for example, an EVCS NOS. The storage 440 may also store a periodically updated queue of users waiting to gain access to the EVCS.

The power control 410 may control the transfer of power from the power grid to a PEV (not shown) connected to the EVCS 400. The power control 410 is instructed by the controller 430 to direct power through the power metering 420 to a vehicle being charged by the EVCS 400. The power control 410 may be, for example, a relay or solid-state switch to either turn on or turn off the charging power to the vehicle in response to an instruction from the controller 430. The power metering 420 may measure the current passing through the power control and accumulate the total charge or energy delivered from the EVCS 400 to the vehicle. This power metering 420 may be used in determining an appropriate cost to the operator of the vehicle.

The controller 430, which may be a computing device including one or more processors and memory, may communicate with the PEV connected to the EVCS 400 using the vehicle communication interface 450. The vehicle communication interface 450 may, for example, provide a pilot line signal to the PEV in accordance with SAE J1772™. The vehicle communications interface 450 may communicate with vehicles in some other manner such as power line communications or wirelessly. Through the vehicle communication interface 450, the controller 430 of the EVCS may receive information from the vehicle indicating the current charge state of a PEV, the rate at which that charge state is changing for a PEV and, as a result, be able to estimate a time-to-full charge state. In some situations, an operator of the PEV may manually provide data acting on behalf of the PEV.

The local wireless communications interface 460 may be used to communicate with a driver's PCD. The local wireless communications interface 460 may also be used to communicate with a network, such as the wide area network 190, using the PCD as a bridge or intermediary. The local wireless communications interface 460 may be used to communicate, via the PCD and network, with an EVCS NOS, such as the NOS 215, 225 or 235, in an EVCS network that includes the EVCS 400. The local wireless communication interface 460 may communicate with the PCD using Bluetooth™, ZigBee™, or some other short-range wireless communications protocol.

The EVCS 400 may use the local wireless communications interface 460 to obtain data pertaining to drivers of PEVs, to obtain access to a queue of potential EVCS users, to transmit data pertaining to use of the EVCS by particular drivers and/or PEVs, and/or to communicate driver and billing information. For example, at the start of a PEV charging operation, the EVCS 400 may receive a driver identifier and an access code via the local wireless communications interface 460. The EVCS 400 may then provide the received driver identifier and the EVCS ID 442 to a remote NOS. At the end of the charging operating, the EVCS 400 may provide data to the NOS indicating that the operation is completed and the total amount of energy delivered to the PEV. In response, the EVCS 400 may receive data pertaining to the next driver in the queue from the NOS. The EVCS 400 may limit access to only that next driver for a changeover period. All of the communications between the EVCS 400 and the NOS may flow through the driver's PCD and the network.

Figure 5:
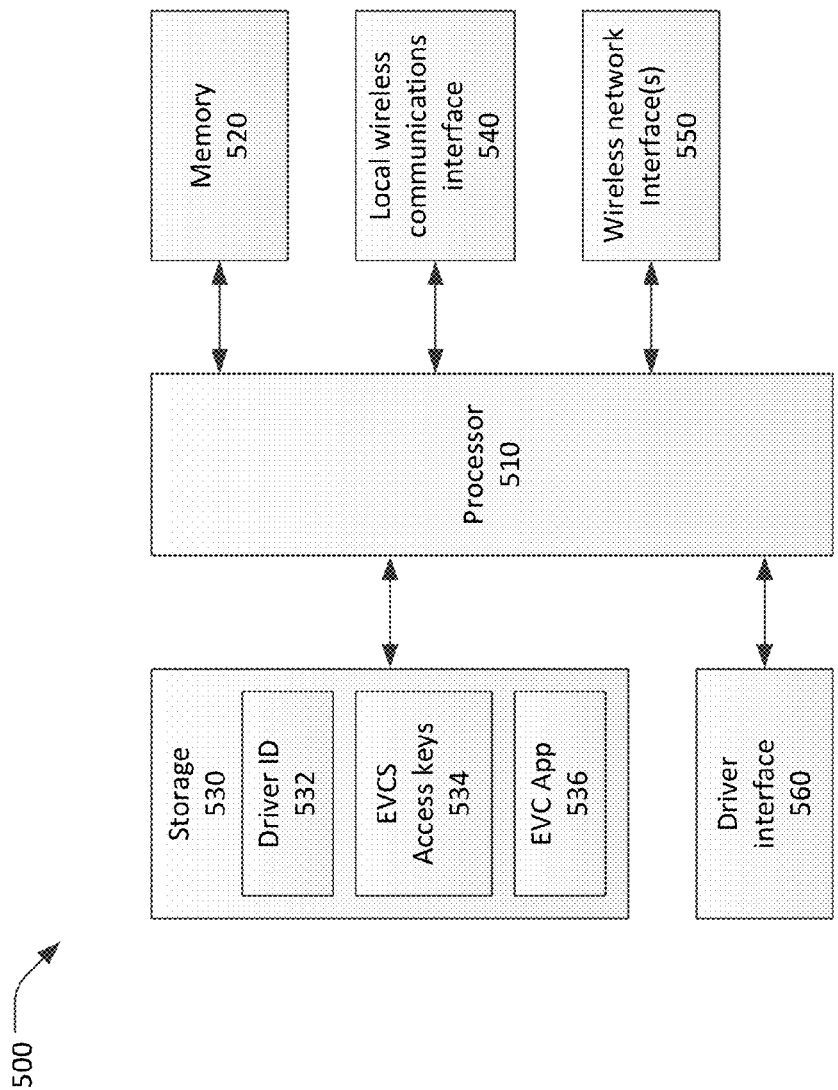
FIG. 5 is a block diagram of a personal computing/communications device.

FIG. 5 shows a block diagram of a PCD 500. The PCD 500 includes a processor 510, memory 520, storage 530, local wireless communications interface 540, wireless network interface(s) 550 and a driver interface 560. The driver interface 560 may be, for example, a touch screen display or some other combination of a display and a data input device such as a keypad and/or a pointing device.

The local wireless communications interface 540 may be, for example, a Bluetooth™, Zigbee™ or wireless local area network interface that can connect within a short distance of the PCD 400. This local wireless communications interface 540 may be used, for example, to connect to the EVCS 400 in order to exchange data pertaining to the EVCS 400.

The wireless network interface(s) 550 may be one or more interface usable to send and receive data over a long-range wireless communication network. This wireless network may be, for example, a mobile telephone network with data capabilities and/or a WiFi™ local area network or other wireless local area network.

The processor 510 and memory 520 serve substantially similar functions to the processor 310 and memory 320 in FIG. 3. The storage 530 may serve substantially similar functions to the storage 330 in FIG. 3. The storage 530 may store a driver ID 532, one or more EVCS access keys 534, and an electric vehicle charging application (EVC App) 536.

The driver ID 532 may be, for example, provided by an EVCS NOS or related web-based software. The driver ID 532 uniquely identifies the operator of the PCD 500 to an EVCS. The driver ID 532, therefore, may be used to enable EVCS charging to an intended operator of the PCD 500 and may enable billing for EVCS services to the correct individual. The driver ID 532 may be transmitted to an EVCS using the local wireless communications interface 540.

The EVCS access keys 534 may enable a driver in possession of the PCD 500 to access an EVCS such as the EVCS 400 in order to charge a PEV. Upon receiving a request to charge a PEV, an EVCS may demand both a driver ID and an access key, and may provide the charging service only if the provided access key matches an access key stored within the EVCS.

When executed, the EVC App 536 may cause the PCD 500 to serve as an interface between the driver and the EVCS. For example, the EVC App may cause a graphical user interface (GUI) for the EVCS to be presented on the driver interface 560. The driver may then use the GUI to request charging services from the EVCS. The EVC App 536 may also cause the PCD to provide the charging service request, the driver ID 532 and an EVCS access key to the EVCS using the local wireless communications interface 540.

Description of Processes

Figure 6:
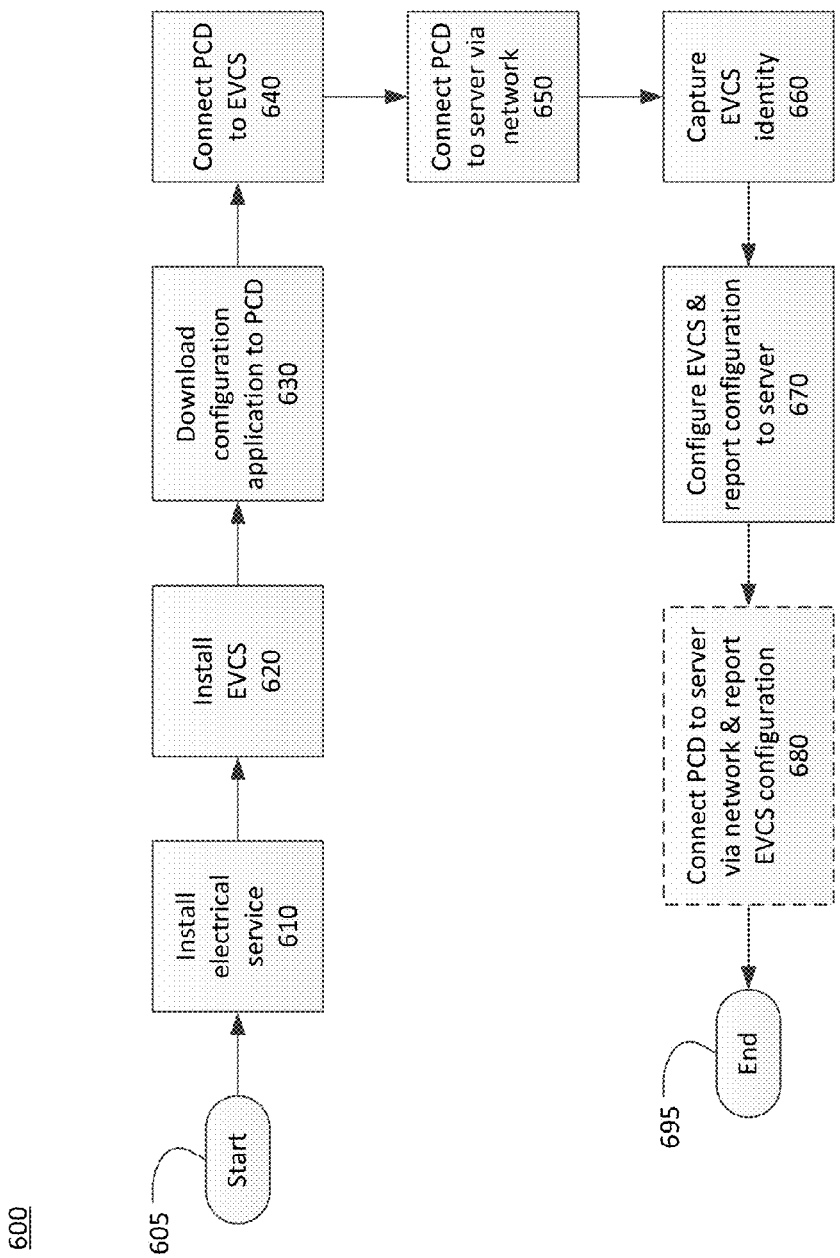
FIG. 6 is a flow chart of a process for provisioning an EVCS.

Referring now to FIG. 6, a process 600 to install, configure and provision an EVCS may start at 605 and end at 695. Although show as a sequence of distinct actions for ease of description, some of the actions may be performed concurrently and/or in different order. The process 600 may be performed in part by one or more electrician, maintenance person, facility manager, or other persons, who will be referred to herein collectively as the "installer".

At 610, the installer may install electrical service for the EVCS. In a commercial environment, installing electric service may include installing a circuit breaker dedicated to the EVCS and running a suitable electrical cable from the circuit breaker to the EVCS location. In a residential application, installing electrical service may also include upgrading electrical service to the residence, upgrading an electrical service meter, and/or installing a new breaker panel.

At 620, the installer may install the EVCS by mounting the EVCS to a suitable support structure and connecting the EVCS to the electrical cable installed at 610. The support structure may be, for example, and existing structure such as a wall or post, or a pedestal mounted on a floor or other paved surface.

At 630, the installer may download an EVCS configuration application to the installer's personal communications/computing device (PCD). This action may not be required if a current version of the EVCS configuration application is already loaded on the PCD. The EVCS configuration application may, when executed by the PCD, give the PCD the capability to initialize the configuration of the EVCS. The EVCS configuration application may also provide diagnostic tools for determining whether or not the charge station is operating within normal parameters. The EVCS configuration application and the PCD may be used to perform the subsequent actions in the process 600.

At 640 the PCD may connect to the EVCS using a wireless communication protocol such as Bluetooth™, ZigBee™, or some other short-range wireless communications protocol. At 650, the PCD may connect with a remote server, such as one of the CMS 160, or NOS 215, 225, 235, via a network such as the wide area network 190. The PCD may connect to the network using, for example, a WiFi™ local area network or a cellular telephone connection. In some situations, such as an EVCS being installed in a basement, a parking structure, or a very remote location, the PCD may be unable to connect to the network and the remote server.

At 660, the PCD may capture the identity of the EVCS. Capturing the EVCS identity may include receiving information such as a model number and serial number from the EVCS over the wireless communications path established at 640. Capturing the EVCS identity may also include obtaining additional information such as an EVSE group name, an EVSE site location and/or name, and an EVSE site owner/manager or other contact name, fixed and/or mobile phone number, e-mail address, mailing address, and/or contact preference information. This additional information may be, for example, entered by the electrician or loaded from a document, such as a work order, already stored within the PCD or the remote server.

At 670, the PCD executing the configuration application may configure the EVCS. Configuring the EVCS may include setting a unique EVCS identifier or ID. The unique EVCS identifier may be randomly generated by the PCD or may be generated by the PCD encrypting or hashing all or part of the EVCS identity information captured at 660. The EVCS ID may be defined by the remote sever and communicated to the EVCS via the PCD. The EVCS ID may be determined in some other manner. The EVCS ID may be a lengthy alphanumeric text string or a binary number. For example, the EVCS ID may be a 16 character text string or a 16-digit hexadecimal number. The EVCS ID may be longer or shorter than 16 characters/digits. Once set, the EVCs may use the EVCS ID to identify itself to drivers and vehicles requesting charging and to a remote server that manages operation of the EVCS. Once set, the EVCS ID may be transmitted to the EVCS over the wireless link established at 640 and stored in nonvolatile memory within the EVCS.

Configuring the EVCS at 670 may also include setting one or more access keys. Each access key may be defined by the remote server and communicated to the EVCS via the PCD. The access keys set at 670 may include an administrative access key that allows a site manager or other operator to access the EVCS for the purpose of changing the EVCS configuration, performing diagnostic tests on the EVCS, updating the EVCS software, or performing other administrative functions. The access keys set at 670 may also include one or more driver access key to allow drivers to request and obtain charging services from the EVCS. Multiple driver access keys may be set for different categories of drivers, different access priorities, and/or different pricing structures. A pricing structure may be associated with each access key and stored in the EVCS. The access keys may include one or more restricted use access key limited to, for example, a specific time window, a particular time of day, or one-time only use.

Configuring the EVCS at 670 may also include setting other operational parameters of the EVSE such as a time, date, and time zone, a maximum allowable time per charge event, and/or whether or not a queue will be used to control access to the EVSE. An EVSE without a queue may serve drivers on a first-come, first-served basis, with PEVs physically waiting in line to access the EVSE. An EVSE with a queue may allow a driver to request a position in the queue without being physically present at the EVSE. The driver may then be notified to bring their PVE to the EVSE when they rise to the top of the queue.

Configuring the EVSE at 670 may also include capturing or entering descriptive data such as an EVSE group name, an EVSE site name, and/or information about a person associated with the site who may be contracted if an issue arises with the EVSE. This information may include a contact name, address, phone number, email address, and contact preference.

When the PCD successfully connected to the server via the network at 650, the EVCS identity and configuration may be reported to the server at 670. The EVCS identity and configuration may be reported to the server either in parallel with or at the end of the configuration action. When the PCD was unable to connect to the server via the network at 650, the PCD may store the EVCS identity and configuration information at 670. After completion of configuring the EVCS, the PCD may be moved to a location where network connection is possible. The PCD may then connect to the network and report the EVCS identity and configuration to the server at 680.

After reporting the EVS identity and configuration to the server at 670 or 680, the process 600 may end at 695.

Figure 7:
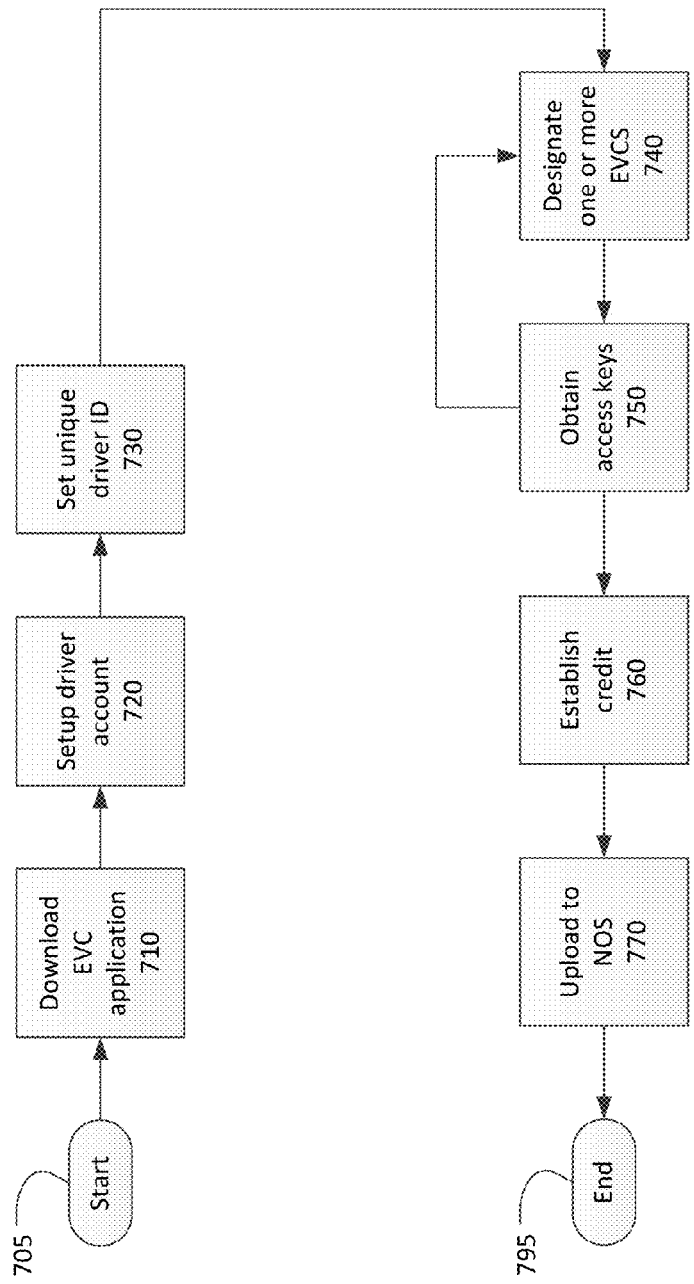
FIG. 7 is a flow chart of a process for activating a driver.

Referring now to FIG. 7, a process 700 to enroll a driver in an EVCS network may start at 705 and end at 795. Although shown as a sequence of distinct actions for ease of description, some of the actions may be performed concurrently and/or in different order.

At 710, the driver may download an EVC application, or "app", into their PCD. The PCD app may include capabilities for managing driver account, managing interactions between the driver and an ENVS, and managing communications with and between the EVCS and a NOS that controls the EVCS network. The EVC app may be configured to communicate with the EVSE via the PCDs integral Bluetooth or other short range wireless communications protocol. The EVC app may be configured to communicate with the NOS via a wireless connection to a network, such as a cellular telephone connection with data capability or a WiFi™ or other network connection. The EVC app may be widely distributed and available to all drivers of electric vehicles.

At 720 the driver may set up an account with the EVC network using the EVC app on their PCD. For example, the EVC app may include a wizard which prompts the user to enter account information such as the user's first and last names, the PCD mobile phone number, the user's e-mail address, a notification preference (e.g. text message to the mobile phone number or e-mail), the user's physical or mailing address, and/or other information.

At 730, a unique driver identification or ID may be negotiated between the NOS and the driver. For example, the EVC app may prompt the driver to enter a proposed user ID. The NOS may then confirm that the proposed user ID is unique. If the proposed user ID is not unique, the NOS may propose a modified ID via the PCD or instruct the PCD to prompt the driver to enter a different suggested user ID.

Once a unique user ID has been set at 730, the driver may designate one or more 'favorite' EVCS for the purpose of streamlining the initiation of a new charging event. Designating favorite EVCS may begin at 740 with the EVC app prompting the driver to identify an EVCS, for example, by entering an address, entering an EVCS identifier, or locating the EVCS on a map. After the driver identifies an EVCS of interest, the EVC app may download information about the EVCE and determine if a special access code or other permission is required to use the EVCE. If a special access code is required, the EVC app may prompt the driver to enter the access code at 740. If the driver does not possess the required access code, the EVC app may inform the driver the selected EVCS is not available without permission and prompt the driver to designate another EVCS.

When an access code is not required or has been entered, the EVC app may download the access key for the identified EVCS from the NOS at 750. The EVC app may save the access key for future use. The actions at 740 and 750 may be repeated until the driver has designated all desired favorite EVCSs.

The EVC app may allow a driver to designate a new favorite EVCS at any time after the driver enrolls in an EVCS network. For example, the EVC app may provide a facility which allows the user to quickly add an EVSE to their list of favorites by interfacing to the EVSE and selecting a button (or sequence of buttons) within the user interface.

The EVC app may maintain a database of EVCS which the driver has used or has indicated an intention to use—either by attempting to queue or by adding the EVCS as a favorite. In addition, the database shall periodically update to include other EVCS in areas of particular interest to the driver. The EVC app shall provide a facility to query the NOS to locate EVCS other than the driver's favorites. The driver may provide present location information to the NOS and request location and status for all publicly accessible EVCS and/or all private/access controlled EVCS for which the driver has appropriate access keys within a user-defined radius of the location. Once an EVCS is located or identified, the EVC app shall provide a facility for accessing exact EVCS location and price/tariff structure and downloading appropriate access keys from the NOS for the identified EVCS.

Once all desired favorite EVCSs have been designated, the EVC app may prompt the user to establish credit for the account at 760. Credit may be added to the account, for example, by the driver providing a credit card and either charging an advance payment against the card or obtaining preapproval for further charges against the card. The credit card processing may be performed by a third party secure credit card transaction facility to isolate credit card security issues from the EVC network. Credit may be added to an account by mailing a checking, direct transfer from the driver's bank account, or some other manner. The NOs may require additional credit to be added to the account any time the credits in the driver's account pass below a predefined threshold.

After credit is established at 760, at 770 the EVC app may upload any driver account information, including designation of favorite EVCS and credit information, not previously uploaded to the NOS.

Figure 8:
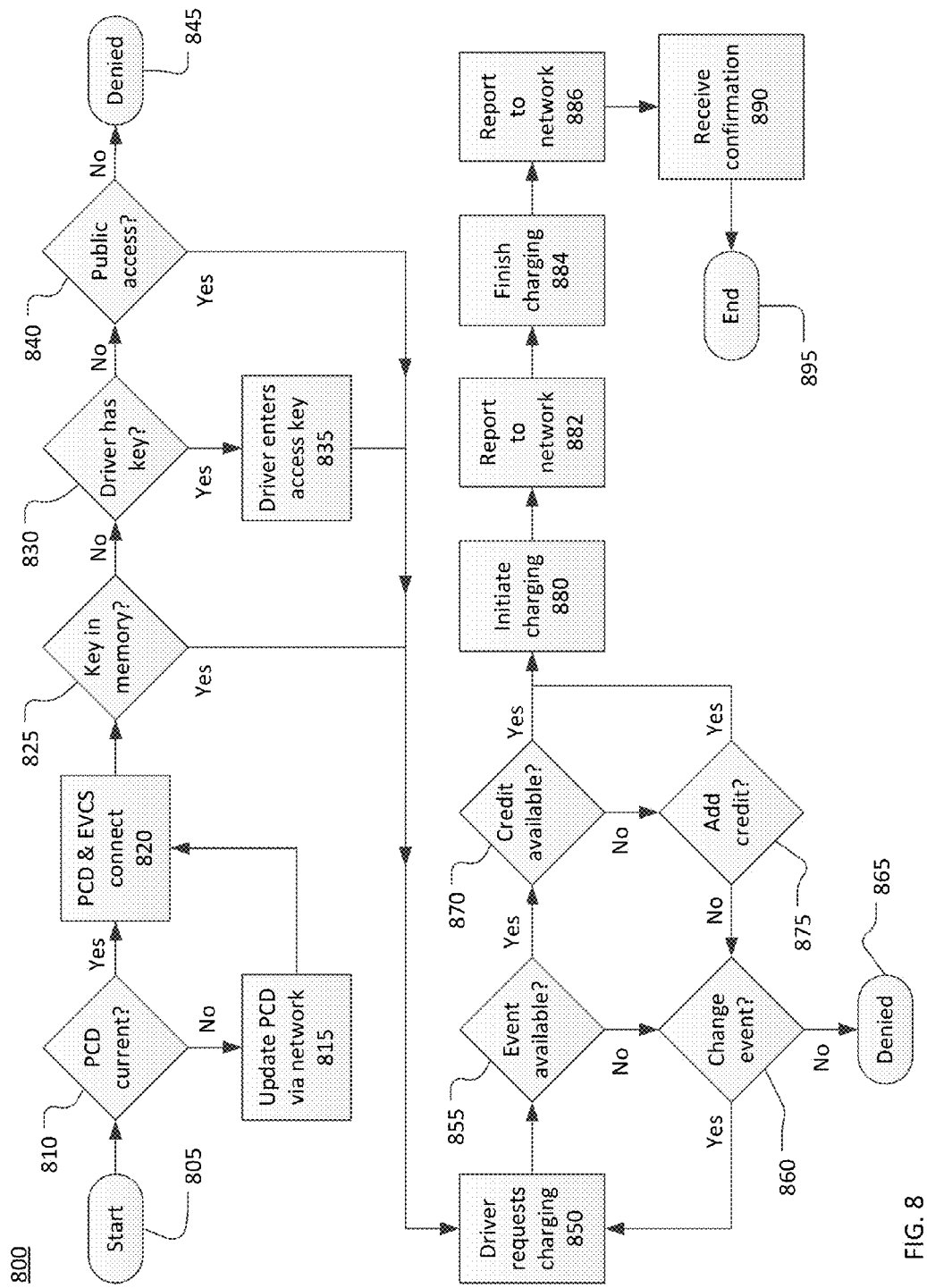
FIG. 8 is a flow chart of a process for accessing an EVCS.
Figure 9:
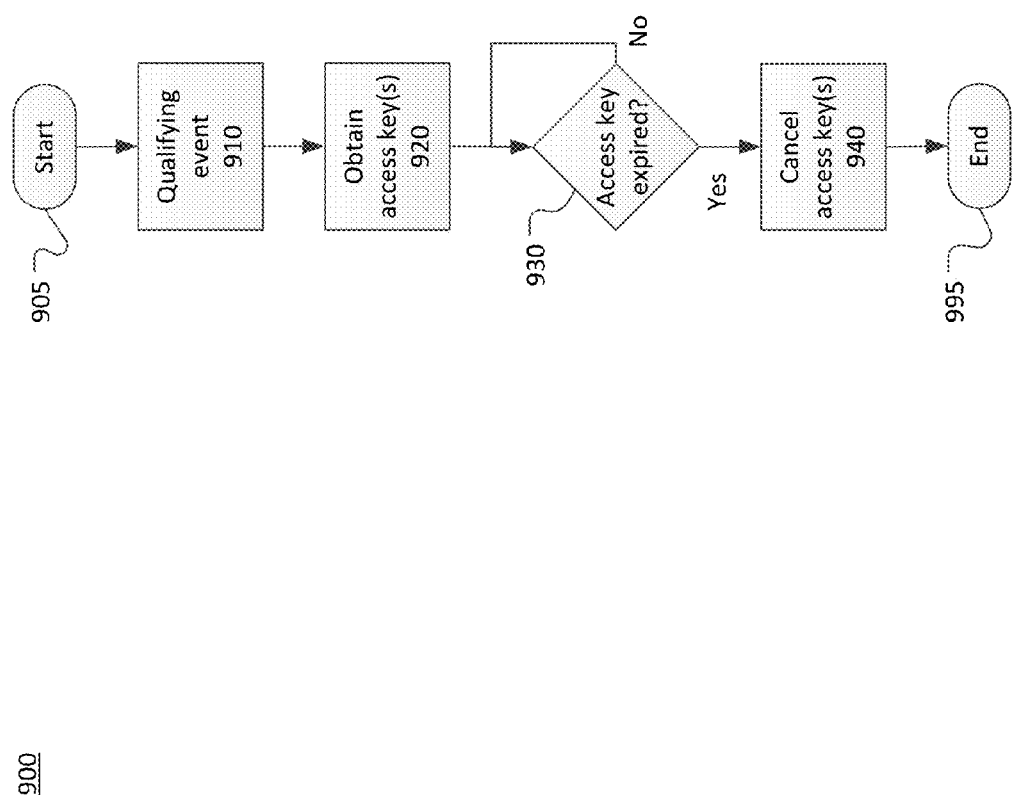
FIG. 9 is a flow chart of a process of obtaining an EVCS access key.

Referring now to FIG. 8, a process 800 for initiating a charging event may state at 805 when a driver approaches an EVSE with the intent to charge an EV. The process 800 may end at 845 or 875 if a driver is denied access to an EVCS or at 895 when a charging event is initiated.

At 810, the driver may bring up an EVC app on his PCD. Upon initiation, the EVC app may immediately determine if it is current, which is to say determine if the EVC app installed on the driver's PCD is the most current version of the EVC app and if the EVC app has the most recently available data on the EVCS network. For example, the EVC app may attempt to update from the NOS at 815 if the EVC app has not been updated with a predetermined time period, such as, for example, within the last 24 hours.

When the EVC app is determined to be current or has been updated at 815, the EVC app may cause the PCD to connect to a nearby EVCS at 820. After handshaking with the EVCS, the app may determine, at 825, whether it has an appropriate access code for the EVCS. If the EVC app does not have an access code for the EVCS, the EVC app may prompt the user for the access key at 830. The user may then enter an access key at 835.

If the user cannot enter an access key at 835, the EVC app may attempt to connect to the NOS at 840 and determine if the charge station is publicly accessible. If it is, the EVC app may download the appropriate public access key. If a determination is made at 840 that the EVCS is not publically accessible, the EVC app may inform the user at 845 that access to the EVCS has been denied. If the PCD cannot reach the NOS at 840, the EVC app may instruct the user to move the PCD to an area where the network is accessible in order to attempt to secure an access key.

After any access has been provided to the EVCS at 825, 835, or 840, the driver may use the EVC app and their PCD to request a charging event at 850. The requested charging event may be defined in terms of a charging rate, a charging duration, a total amount of charge to be delivered, or in some other manner. At 855, the EVCS may make a determination whether or not the requested charging event is available. For example, the EVCS may operate a queuing or reservation system. The charging event requested at 850 may be unavailable if extends into a future time period already reserved for another driver.

When the charging event requested at 850 is determined to be unavailable to 855, the driver may be given the option at 860 to change the charging event (e.g. by shortening the requested charging time). If the driver will accept a different charging event, the process 800 may return to 850. If the driver will not accept a different charging event, the process 800 may end at 875. The actions from 850 to 860 may be repeated until an acceptable charging event is negotiated between the driver and the EVCS.

When a determination is made at 855 that the requested charging event is available, a further determination may be made at 865 if the driver has sufficient credit available to pay for the requested charging event. The EVC app on the driver's PCD may maintain a running account of the prepaid or pre-approved credit available to the driver. In the event that the available credit is insufficient to pay for the requested charging event, the driver may be prompted to add additional credit to his account at 870. If the driver is unable or unwilling to add credit to his account, the driver may be given the option at 860 to change the charging event (e.g. by shortening the requested charging time). If the driver will accept a different charging event, the process 800 may return to 850. If the driver will not accept a different charging event, the process 800 may end at 875.

When a determination is made at 865 that the driver has sufficient credit, or when the driver adds sufficient credit at 870, the requested charging event may be initiated at 880. To initiate the event, the EVC app may created an event record including the driver identification, the EVCS identification, the EVCS access key (from 825, 835, or 840), and an event descriptor such as the charging duration. The EVC app may provide the event record to the EVCS. When the event record is acknowledged by the EVCS, the EVC app may store the event record in memory and debit the appropriate amount from the driver's available credit. The event record of the charging event may be reported to the NOS via the driver's PCD at 882. The completion of the charging event at 884 may also be reported to the NOS at 886.

Some EVCS may be located where a network connection is not normally available. In this situation, the initiation and/or completion of the charging event may be stored in the EVCS and the PCD and reported to the NOS when the PCD is able to connect with the network. In the case where the driver's PCD is not present when the charging event is completed, the completion of the charging event may be stored in the EVCS and reported to the NOS via the PCD of the next driver to use the EVCS. To ensure that the charging event is successfully reported to the NOS, the EVCS may receive a confirmation from the NOS at 890. The confirmation may be received at 890 via a PCD of a driver other than the driver whose vehicle was charged. The EVCS may repeatedly report the charging even to the NOS via the PCDs of successive drivers until a confirmation is received from the NOS. The process 800 may then end at 895.

As previously described in conjunction with FIG. 7, a driver may also receive one or more EVCS access keys from a NOS at the time the driver enrolls in an EVCS network. FIG. is a flow chart of a process 900 by which a driver may receive one or more qualified access keys from a party other than the NOS. A "qualified access key" is an access key that is only given only to drivers that have qualified to receive the access key. A driver may have, at any time, more than one qualified access key received from more than on party. A separate instantiation of the process 900 may be ongoing for each qualified access key or set of qualified access keys.

The process 900 may start at 905 with a driver who has enrolled in an EVCS network. At 910, the driver may participate in a qualifying event. A "qualifying event" is some action or circumstance that qualifies the driver to receive a qualified EVCS key for one or more specific EVCS. For example, a hotel may have one or more EVCS for the convenience of its guests. A driver staying at the hotel (qualifying event) may receive a qualified access key that allows the driver to charge his PEV at the hotel's EVCS only duration the duration of his stay. A shopping mall may have one or more EVCS for the convenience of its customers. A driver shopping at the may receive a qualified access key good for future use, for example after making purchases totaling more than a predetermined threshold (qualifying event). An industrial facility may have one or more EVCS for the convenience of its employees. A customer, supplier, or other visitor at the facility (qualifying event) may receive a qualified access key that allows a driver to charge his PEV only on the date of the visit. A new employee may receive one or more qualified access keys when he starts employment at the facility.

As a result of the qualifying event at 910, the driver may receive one or more qualified access keys at 920. The qualified access keys may be provided to an EVC app running on the driver's PCD via a wireless connection.

The EVC app may monitor the status of all access keys stored in the PCD. At 930, the EVC app may determine whether or not any of the qualified access keys have expired. A qualified access key may expire through use, through the passage of time, or because the driver no longer meets the qualification requirements. Any expired qualified access keys may be deleted from the PCD memory at 940 and the process 900 may end at 995.

Figure 10:
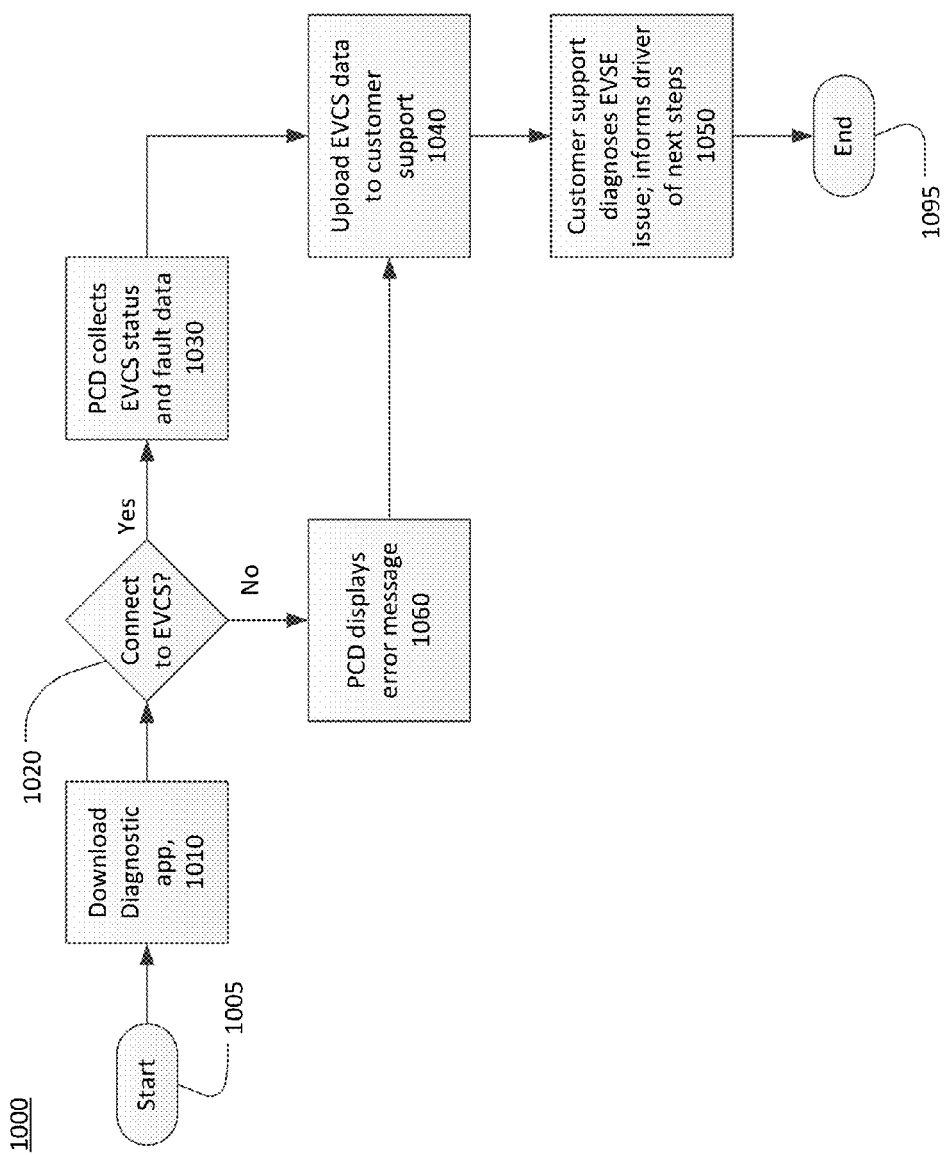
FIG. 10 is a flow chart of a process for diagnosis of an EVCS.

A user's PCD may also be used to diagnose EVCS maintenance issues. FIG. 10 is a block diagram of a process 1000 for diagnosing EVCS problems. The process 1005 may start at 1005 and may end at 1095. At 1010, a driver, facility manager, maintenance worker, or other user may download an EVCS diagnostic app to their PCD. The EVCS diagnostic app may be downloaded when the PCD is proximate to the EVCS to be diagnosed. The EVCS diagnostic app may be downloaded when the PCD is remote from the EVCS if a network connection is not available at the location of the EVCS.

At 1020, the diagnostic app running on the PCD may attempt to connect to the EVCS using Bluetooth or other short range wireless communications protocol. If a connection can be made, the PCD may collect EVCS status and fault data at 1030. The PCD may upload the status and fault data from the EVCS to the EVCS network at 1040. The EVCS network may forward this data to a customer support server or customer support personnel. If a network connection is not available at the location of the EVCS, the PCD may have to be moved to a location where a network connection is possible in order to upload the data collected from the EVCS.

When a connection cannot be established between the PCD and the EVCS at 1020, a suitable error message may be displayed to the used via the PCD at 1060. The process may then continue at 1040, uploading the fact that communications cannot be established with the EVCS.

At 1050, the EVCS server and/or EVCS customer support personnel may diagnose the EVCS issue and inform the user of the next steps. The next steps may involve, for example, further tests to be initiated by the user or dispatching EVCS field service personnel to repair or replace the EVCS. The process 1000 may then end at 1095.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An electric vehicle charging station, comprising:
   a power controller to control the flow of power from a power grid;
   a controller coupled to the power controller; and
   a wireless communications interface operable to communicate with a personal computing/communications device using a short range wireless communications protocol, the wireless communications interface incapable of communicating directly with a remote server;
   wherein the controller is configured to store session data for a series of charging sessions in memory until an appropriate personal computing/communications device enters within range of the wireless communications interface and to communicate the session data for the series of charging sessions by first transmitting the session data from the electric vehicle charging station opportunistically through the wireless communications interface to the personal computing/communications device external to the electric vehicle charging station and then by transmitting the session data through a long-range wireless communications interface of the personal computing/communications device capable of communicating directly with the remote server to thereby enable electric vehicle charging.

2. The electric vehicle charging station of claim 1, wherein the controller is configured to store one or more access keys received from the remote server via the wireless communications interface and an installer's personal computing/communications device.

3. The electric vehicle charging station of claim 2, wherein the controller is further configured to accept a charging request from a driver of an electric vehicle via the wireless communications interface and the driver's personal computing/communications device.

4. The electric vehicle charging station of claim 3, wherein the controller is further configured to control the power control to allow power to flow from the power grid to the electric vehicle only after receipt, from the driver's personal computing/communications device via the wireless communications interface, of an access key that matches one of the one or more access keys stored within the electric vehicle charging station.

5. The electric vehicle charging station of claim 3, wherein the controller is further configured to report at least one of initiation of charging the electric vehicle and completion of charging the electric vehicle to the remote server via the wireless communications interface and the driver's personal computing/communications device.

6. An electric vehicle charging network, comprising:

one or more electric vehicle charging stations, each electric vehicle charging station configured to communicate with personal computing/communications devices via a short range wireless communications protocol, the short range wireless communications protocol incapable of communicating directly with a remote server wherein each electric vehicle charging station stores data for a series of charging sessions in memory until an appropriate personal computing/communications device enters within range of the wireless communications interface; and a server configured to communicate with personal computing/communications devices via a second wireless communication protocol different from the short range wireless communications protocol, the second wireless communications protocol capable of communicating directly with a personal computing/communications device, wherein each electric vehicle charging station communicates the session data for the series of charging sessions by first transmitting the session data from the electric vehicle charging station opportunistically using the short range wireless communications protocol through an available personal computing/communications device external to each electric vehicle charging station and then by transmitting the session data through a long-range wireless communications interface of the personal computing/communications device to the server using the second wireless communications protocol.

7. The electric vehicle charging network of claim 6, wherein the second wireless communications protocol is one of a wireless local area network protocol and a cellular telephone network data communications protocol.

8. A method of provisioning an electric vehicle charging station, comprising:

storing session data for a series of charging sessions in memory of the electric vehicle charging station until an appropriate personal computing/communications device enters within range of the electric vehicle charging station;

transferring the session data between the electric vehicle charging station and a remote server opportunistically via the personal communications/computing device external to the electric vehicle charging station, wherein the personal communications/computing device communicates the session data to the electric vehicle charging station via a short range wireless communications protocol, the short range wireless communications protocol incapable of use in communicating directly with the remote server, and then, the personal communications/computing device communicates the session data to the remote server using a second wireless communications protocol different from the short range wireless communications protocol, the second wireless communications protocol capable use in communicating directly with the remote server.

9. The method of claim 8, wherein the second wireless communications protocol is one of a wireless local area network protocol and a cellular telephone network data communications protocol.

10. The method of claim 8, further comprising:

downloading an application to the personal communications/computing device; and executing the application to manage transferring configuration information between the electric vehicle charging station and the remote server.

11. The method of claim 8, wherein transferring configuration information further comprises:

transferring an electric vehicle charging station identifier from the electric vehicle charging station to the server.

12. The method of claim 8, wherein transferring configuration information further comprises:

transferring one or more access keys from the server to the electric vehicle charging station.

\* \* \* \* \*